(12) United States Patent
Shintani et al.

(10) Patent No.: US 8,986,142 B2
(45) Date of Patent: Mar. 24, 2015

(54) CHAIN GUIDE FOR USE IN ENGINE

(75) Inventors: Tadashi Shintani, Osaka (JP); Hiroyuki Ando, Hiki-gun (JP)

(73) Assignees: Tsubakimoto Chain Co., Osaka (JP); Tokyo Chikuma Sangyo Co. Ltd., Tokyo (JP)

( * ) Notice: Subject to any disclaimer, the term of this patent is extended or adjusted under 35 U.S.C. 154(b) by 1834 days.

(21) Appl. No.: 12/143,057

(22) Filed: Jun. 20, 2008

(65) Prior Publication Data

US 2009/0075769 A1 Mar. 19, 2009

(30) Foreign Application Priority Data

Aug. 24, 2007 (JP) .................................. 2007-218587

(51) Int. Cl.
*F16H 7/08* (2006.01)
*F16H 7/18* (2006.01)

(52) U.S. Cl.
CPC ....................................... *F16H 7/18* (2013.01)

USPC ............................................. 474/111; 474/140

(58) Field of Classification Search
USPC ............ 474/91, 111, 140, 101, 109, 136, 138
See application file for complete search history.

(56) References Cited

U.S. PATENT DOCUMENTS

| 5,045,032 A | * | 9/1991 | Suzuki et al. | 474/140 |
| 5,318,482 A | * | 6/1994 | Sato et al. | 474/111 |
| 5,813,935 A | * | 9/1998 | Dembosky et al. | 474/111 |
| 6,519,992 B1 | * | 2/2003 | Schnupp | 29/421.1 |

FOREIGN PATENT DOCUMENTS

JP 10-292855 11/1998

* cited by examiner

*Primary Examiner* — William A Rivera
(74) *Attorney, Agent, or Firm* — Howson & Howson LLP

(57) ABSTRACT

Longitudinal grooves having rectangular cross-sections are formed by surface pressing in the front and/or back surfaces of the metal base plate of a chain guide. In the case of a chain guide for a roller chain, the grooves can be positioned so that they are located opposite the parts of the shoe surface that is contacted by the link plates on both sides of the chain.

4 Claims, 9 Drawing Sheets

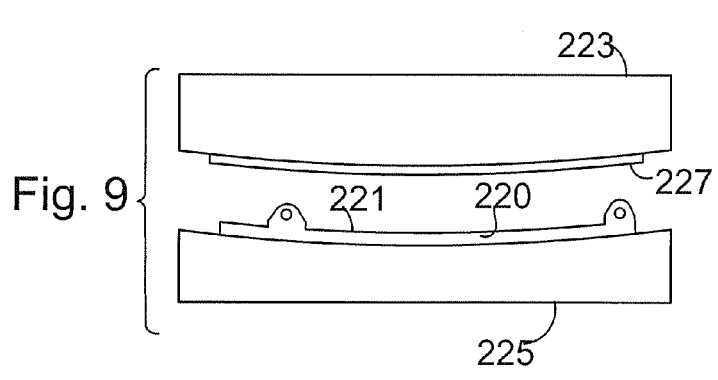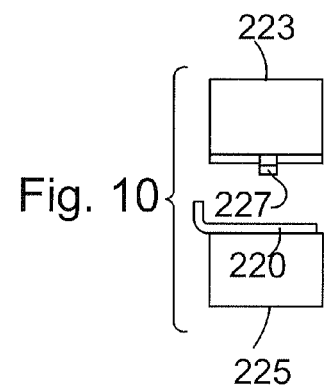

CHAIN GUIDE FOR USE IN ENGINE

CROSS-REFERENCE TO RELATED APPLICATION

This application claims priority on the basis of Japanese patent application 2007-218587, filed Aug. 24, 2007. The disclosure of Japanese application 2007-218587 is hereby incorporated by reference.

FIELD OF THE INVENTION

The invention relates to a chain guide, on which a timing chain slides in an engine valve timing transmission.

BACKGROUND OF THE INVENTION

In a typical automobile engine, an endless timing chain is used to transmit rotation from an engine crankshaft sprocket to one or more engine camshaft sprockets. The chain is typically in sliding contact with two chain guides, one being a stationary guide fixed to the engine, and the other being a movable guide in the form of a pivoted tensioner lever which cooperates with a tensioner to control chain tension. In each of the two kinds of chain guide, the chain travels longitudinally in sliding contact with a front surface of an elongated shoe. A base plate supports the back surface of the shoe. Together, the shoe and base plate prevent deformation and breakage of the chain by constraining the chain so that it does not deviate from a plane of travel, and so that it travels along a path having a predetermined curvature. An example of a typical chain guide is described in Japanese Laid-Open Patent Publication No. Hei. 10-292855.

Even if the base plate of the guide is made of steel, it is likely to undergo deformation and breakage due to excessive loads applied to the guide by the chain, specially in the high temperatures environment in an engine, where the temperature can exceed 200° C. The strength of the base plate can be enhanced by the use of more durable materials, but the use of such materials leads to a significant increase in manufacturing costs. Increasing the thickness of the base plate is another measure that can be taken to avoid deformation and breakage of the base plate, but increasing the thickness of the base plate is often not a desirable option because of limited space in the engine.

Accordingly, an object of the invention is to provide a chain guide, which reliably maintains a predetermined path of travel of the chain without the need for a thick base plate, and in which deformation and breakage of the base plate are avoided even when the chain guide is subjected to large forces under high temperature operating conditions in an engine.

SUMMARY OF THE INVENTION

The chain guide according to the invention comprise a shoe and a base plate supporting the shoe. The shoe is an elongated shoe having a convex, curved, front surface for sliding contact with a transmission chain traveling along the direction of elongation of the shoe and a concave back surface opposite from said front surface. The base plate is an elongated base plate, having opposite front and back surfaces, the front surface of the base plate being engaged with the back surface of the shoe, whereby the base plate supports the shoe along substantially the entire length of the shoe. The improvement resides in the formation, by surface pressing, of at least one narrow reinforcing groove in one of the front and back surfaces of the base plate, each narrow reinforcing groove extending longitudinally along one of the front and back surfaces of the base plate.

The narrow reinforcing groove preferably has a rectangular cross-sectional shape.

Roller chains and rollerless bushing chains have link plates overlapping one another along both sides of the chain. In a chain guide for use with a roller chain or a rollerless bushing chain the shoe preferably has parallel, longitudinally extending guide walls, spaced laterally from each other and extending in the direction in which the front surface of the shoe faces, for limiting lateral movement of a chain traveling in sliding contact with the front surface of the shoe. Multiple, parallel, narrow, reinforcing grooves are formed in one of the front and back surfaces, the grooves being laterally spaced from each other and located inboard with respect to the longitudinally extending guide walls of the shoe. The grooves are positioned opposite to portions of the front surface of the shoe link on which link plates of a roller chain or rollerless bushing chain travel.

Another aspect of the invention is the method for making the above-described chain guide, the method comprising the steps of forming said at least one narrow reinforcing groove by surface pressing one of the front and back surfaces of an elongated base plate, and attaching a shoe to the base plate.

The formation of a narrow reinforcing groove or grooves removes strain remaining in the base plate, and significantly improves the strength of the plate. Therefore, a predetermined chain path along the longitudinal direction of the guide can be maintained without the need to increase the thickness of the base plate. Furthermore, superior endurance can be achieved, and deformation and breakage of the base plate are prevented even when large pressing loads are applied to the chain guide by a transmission chain in a high temperature engine environment.

When the groove or grooves are formed on the front surface of the base plate, i.e., the surface in contact with the shoe, they can function as internal oil passages for lubricating oil adhering to the chain guide. Therefore, the passages can dissipate frictional heat generated as the transmission chain travels in sliding contact with the shoe, thereby preventing excessive accumulation of heat at the interface between the back surface of the shoe and the front surface of the base plate.

When plural grooves are positioned inboard of the guide walls of the shoe so that they are located opposite to the link plates of a transmission chain, they are especially effective in suppressing deformation of the base plate due to excessive pressing loads imparted to the guide by the chain.

The narrow reinforcing grooves are preferably rectangular in cross section in order to avoid narrowing of the groove width due to subtle errors in the plate thickness during surface pressing, and to avoid early wear of the working surface of the pressing tool used to form the grooves. However, the grooves can have various other cross-sectional shapes, such as a semi-circular arc shape or a triangular shape.

Multiple narrow reinforcing grooves can be formed both in the front surface and in the back surface of the base plate. These grooves reliably remove remaining strain in the base plate, stabilizing the plate and improving its strength.

BRIEF DESCRIPTION OF THE DRAWINGS

FIG. 9 is a schematic side elevational view of an elongated base plate and a surface pressing tool for forming a narrow reinforcing groove in the back surface of the base plate; and FIG. 10 is a schematic end elevational view of the base plate and surface pressing tool as seen from the right side of FIG. 9.

DETAILED DESCRIPTION OF THE PREFERRED EMBODIMENTS

The chain guide according to the invention includes an elongated shoe with a curved surface on which a transmission chain can slide longitudinally, and a base plate which extends longitudinally along the back surface of the shoe and supports the shoe. The guide can be either a fixed guide, or a movable guide which both guides the chain and at the same time maintains tension in the chain. The chain guide of the invention maintains the chain in a path having a predetermined curvature. The grooves formed in the base plate allow the base plate to resist deformation and breakage which can otherwise result from excessive pressing loads in a high temperature engine environment, without the need for increasing the thickness of the base plate.

The base can be composed of any material that exhibits adequate endurance as changes in the tension of a transmission chain occur in a high temperature environment. Metals such as steel can be used. However, aluminum is preferred because of its light weight.

The curvature of a guide can vary along its length. For example, a movable guide typically has a small radius of curvature at its chain entry and exit ends, and a large radius of curvature in its intermediate part. A typical fixed guide similarly has small radii of curvature at its chain entry and exit ends, and a large radius of curvature at its intermediate part. In the case of a fixed guide, it is common for the intermediate part to have a very large radius of curvature, and the intermediate part can even be straight.

In accordance with the invention, narrow longitudinal grooves are formed in the base plate of the guide by surface pressing. The manner in which surface pressing improves the strength of the plate is not fully understood at present. However, it is believed that, when compressive stress is applied to the surface of the base plate by surface pressing, plastic deformation occurs and strain remaining in the base plate is removed. The base plate form is stabilized, and a significant improvement in the plate strength is achieved.

The cross-sectional shape of the narrow grooves obtained by surface pressing can vary. Suitable shapes include a rectangular shape, a semicircular arc shape, a triangular shape and others. A rectangular shape and semicircular arc shape are preferred because they cause less wear on the working surface of the surface pressing tool. The number of narrow grooves in a front or back surface of the base plate can vary from one to any number.

Figure 1:
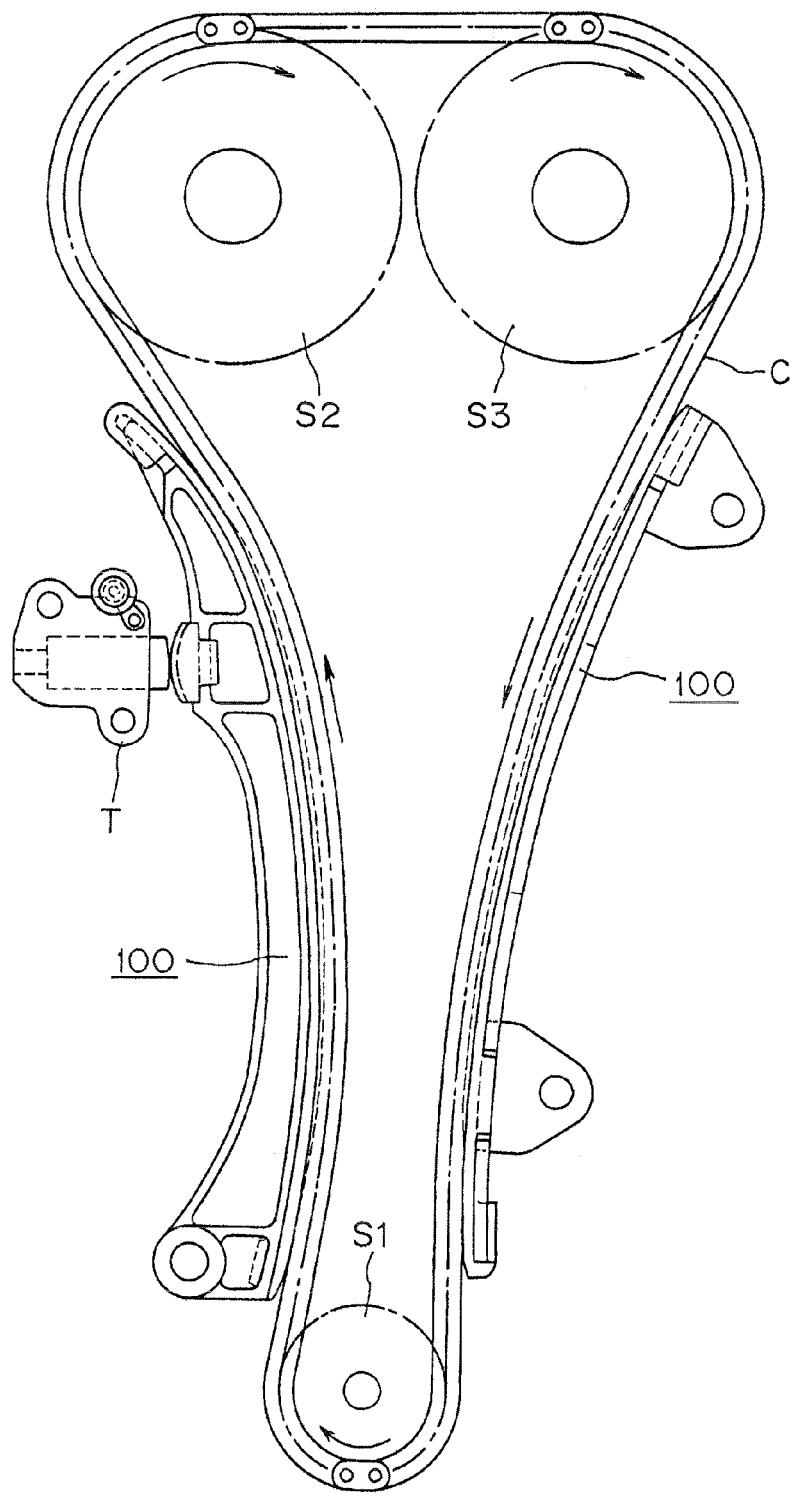
FIG. 1 is a front elevational view of an engine timing transmission equipped with fixed and pivoted chain guides in accordance with the invention.

As shown in FIG. 1, an engine timing transmission comprises an endless chain C engaged with and driven by an engine crankshaft sprocket S1 and in driving relation ship with a pair of engine camshaft sprockets S2 and S3. The direction of the chain travel relative to the guide is indicated by arrows. A pivoted guide 100 is urged by the plunger of a tensioner T into engagement with the chain C to maintain tension in the portion of the chain moving from sprocket S1 to sprocket S2 as the chain slides longitudinally on the pivoted guide. The timing transmission also has a fixed guide 100, in sliding contact with the portion of chain C that moves from sprocket S3 to sprocket S1.

Both the movable and fixed chain guides have a similar structure in that each comprises a shoe having a front surface in sliding contact with the chain and a base plate engaged with the back of the shoe for supporting the shoe. The invention will be described with reference to the fixed guide, but it should be understood that the features that distinguish the invention can be incorporated into the pivoted guide as well.

Figure 2:
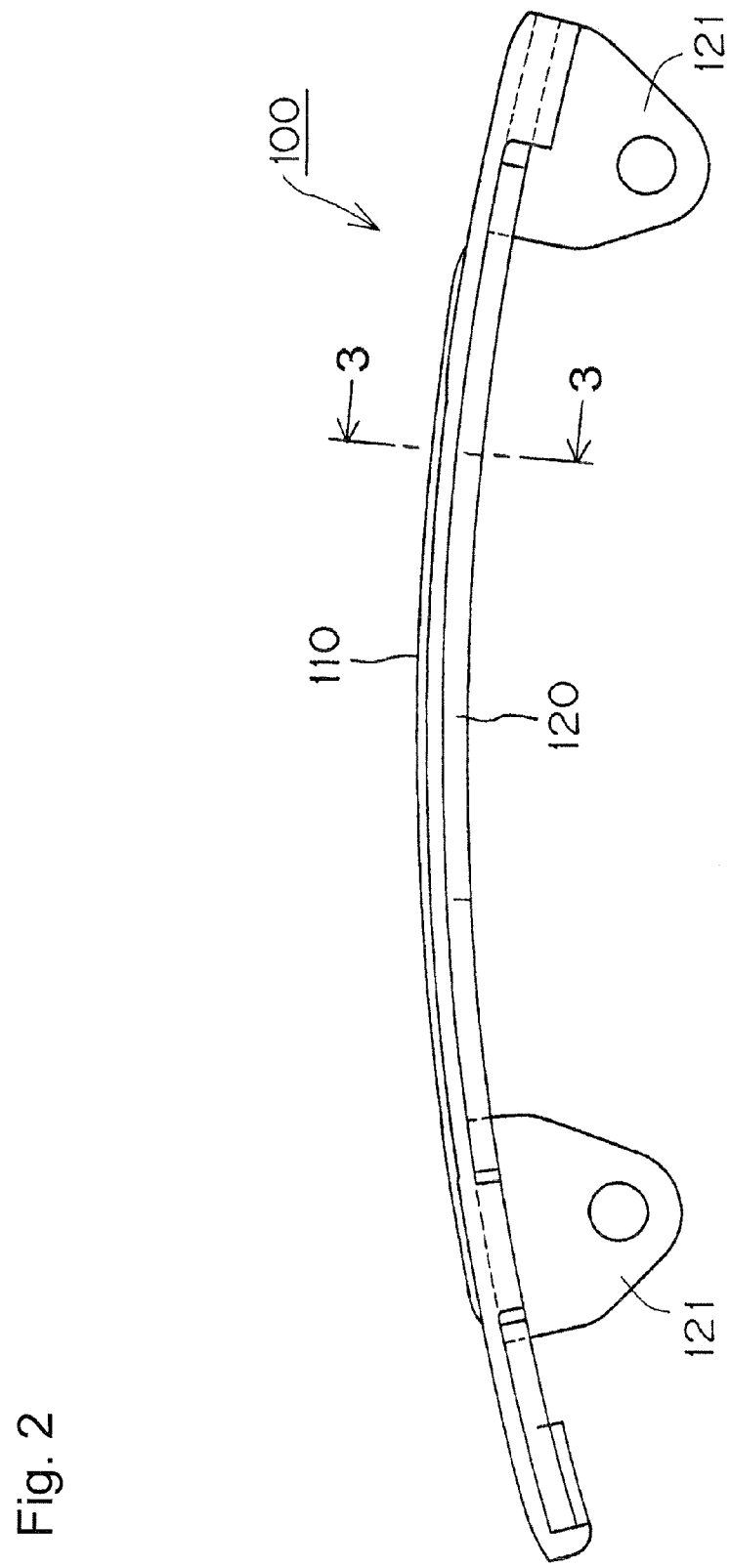
FIG. 2 is a side elevational view of the fixed chain guide of FIG. 1.

As shown in FIG. 2, the fixed chain guide 100 is an elongated guide that includes a synthetic resin shoe 110 having a front surface which comes into sliding contact with a chain. The guide also comprises a shoe-supporting metal base plate 120, which is engaged with the back surface of the shoe 110 along the longitudinal direction of the guide. As seen in FIG. 2, the front surface of the shoe has a convex curvature along the direction of elongation of the shoe and the rear surface of the shoe has a concave curvature. The rear surface of the shoe 110 is in contact with, and conforms to, the front surface of the base plate, which, as seen in FIG. 2, is convex along its direction of elongation, and the rear surface of the base plate has a concave curvature.

Mounting flanges 121 extend from the base plate 120 adjacent the chain entry and chain exit ends for attachment of the chain guide to a wall of an engine.

Figure 3:
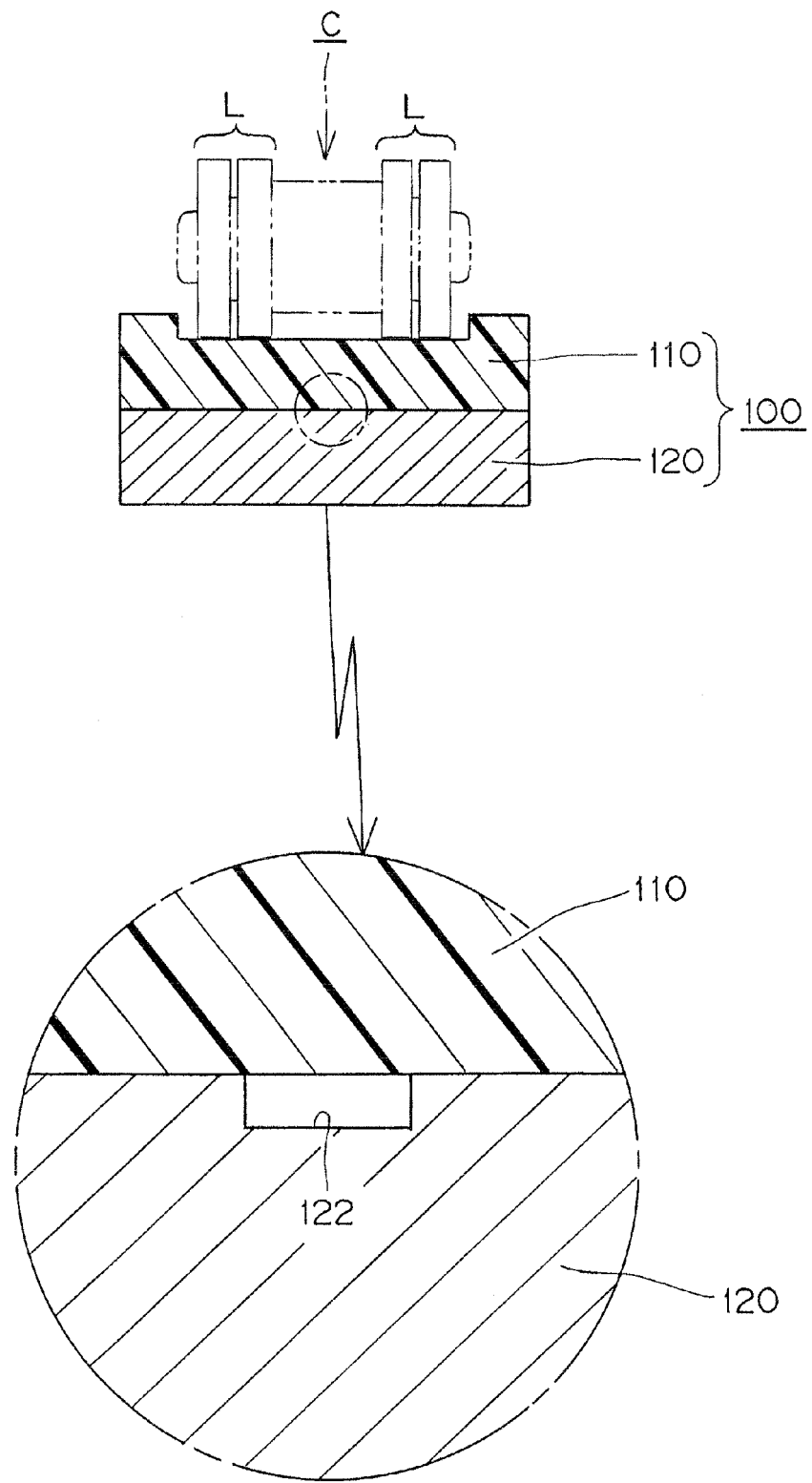
FIG. 3 is a sectional view taken on plane 3-3 in FIG. 2, showing a chain traveling on the guide, and including an enlarged auxiliary view showing a groove on the front surface of the base plate of the guide.

In the version of the chain guide 100 shown in FIG. 3, a centrally located, narrow, longitudinal groove 122 is formed in the front surface of the base plate 120, that is, the surface of the base plate that is engaged with the back of the shoe. Because the groove is formed in the surface of the base plate, the groove necessarily has the same curvature as that of the surface in which it is formed. This groove 122 is produced by surface pressing, a process in which a pressing tool having a ridge corresponding to the shape of groove 122 is forced against the front surface of a blank base plate. In the pressing operation, the metal of the base plate undergoes plastic deformation, and strain remaining within the base plate metal is removed so that the base plate form is stabilized.

The formation of groove 122 in the base plate not only removes strain but also provides a longitudinal oil passage between the shoe and the base plate. The groove 122 has a rectangular cross-sectional shape. Adoption of a rectangular groove shape avoids narrowing of the groove due to subtle errors in plate thickness. Consequently an oil passage extending along the full the length of the shoe is reliably formed.

Moreover, the rectangular shape avoids early wear of the working surface of the surface pressing tool.

Since the narrow reinforcing groove 122 fully removes the strain in the plate, it significantly improves plate strength, and ensures that a predetermined curvature of the chain path is maintained without the need to increase the thickness of the base plate. The narrow reinforcing groove 122 also helps to dissipates frictional heat created as the transmission chain C slides on the shoe 110. Deformation and breakage of the base plate 120 due to excessive pressing load applied to the chain guide by the chain C in the high temperature engine environment, are also prevented.

Figure 4:
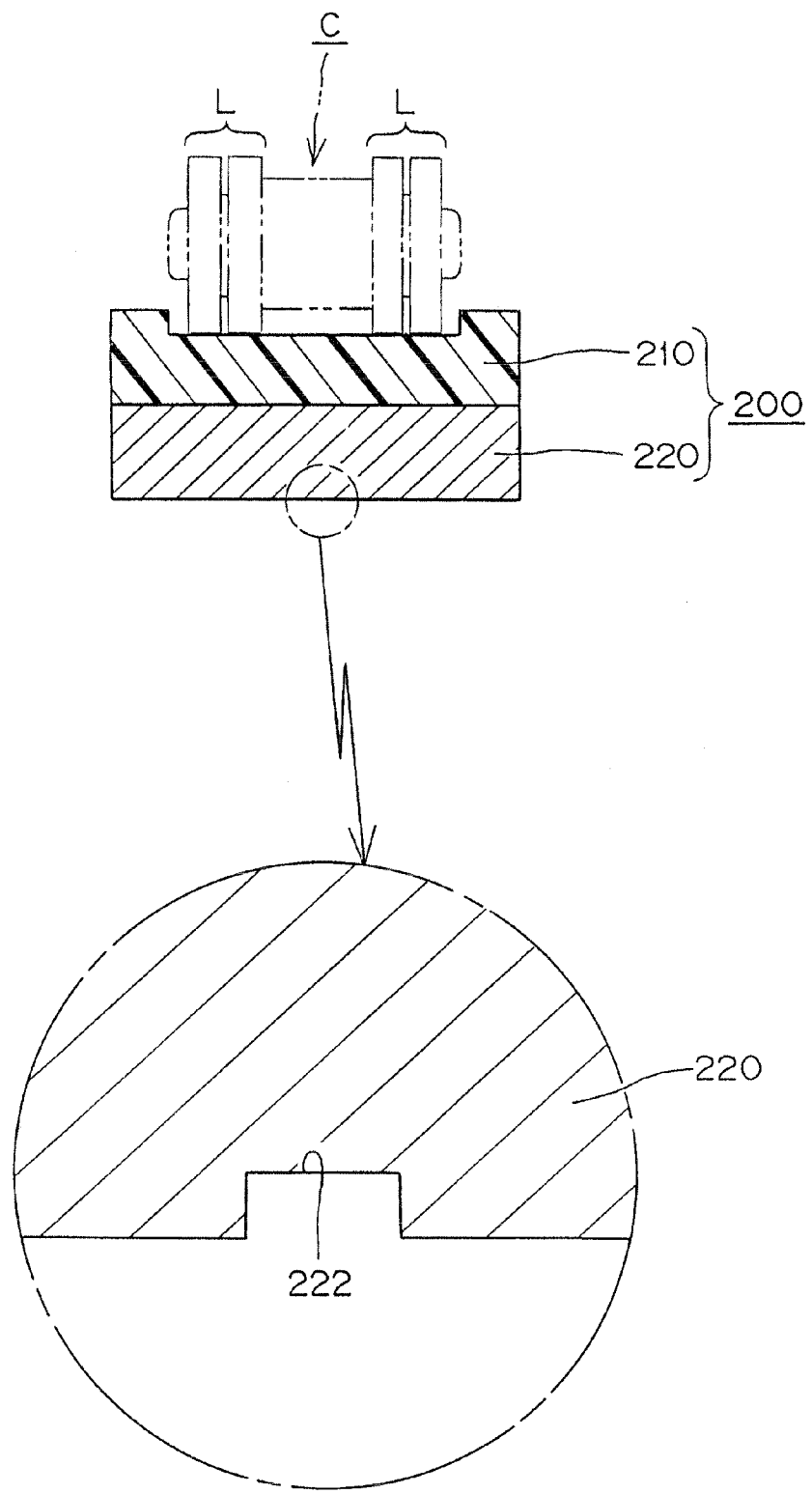
FIG. 4 is a sectional view taken on plane 3-3 in FIG. 2, showing a chain traveling on the guide, and including an enlarged auxiliary view showing a groove on the back surface of the base plate.

The chain guide 200, shown in FIG. 4, has a shoe 210 and a base plate 220 that have substantially the same configuration as the shoe and base plate in FIG. 3, except that the rectangular recess is formed on the back surface of the base plate 220, that is, the surface opposite from the front surface that is in contact with the shoe. This narrow reinforcing groove 222 is also formed by surface pressing and removes remaining strain in the base plate, thereby stabilizing the form of the base plate. Deformation and breakage of the base plate 200 are prevented when an excessive pressing load is applied to the guide by a chain in a high temperature engine environment, and even when compressive stress acts on the plate along the longitudinal direction of the guide. The groove 222 removes remaining strain in the base plate 220 to stabilize the base plate form.

As shown in FIGS. 9 and 10, the reinforcing groove is formed in the back surface 221 of base plate 220 by the use of a surface pressing tool having opposed parts 223 and 225 which are movable toward and away from each other. The plate 220 is placed on part 225 so that its back surface faces part 223 of the press. Part 223 is formed with an elongated ridge 227, which forms the groove in the back surface of the base plate when the parts of the pressing tool are brought toward each other.

Figure 5:
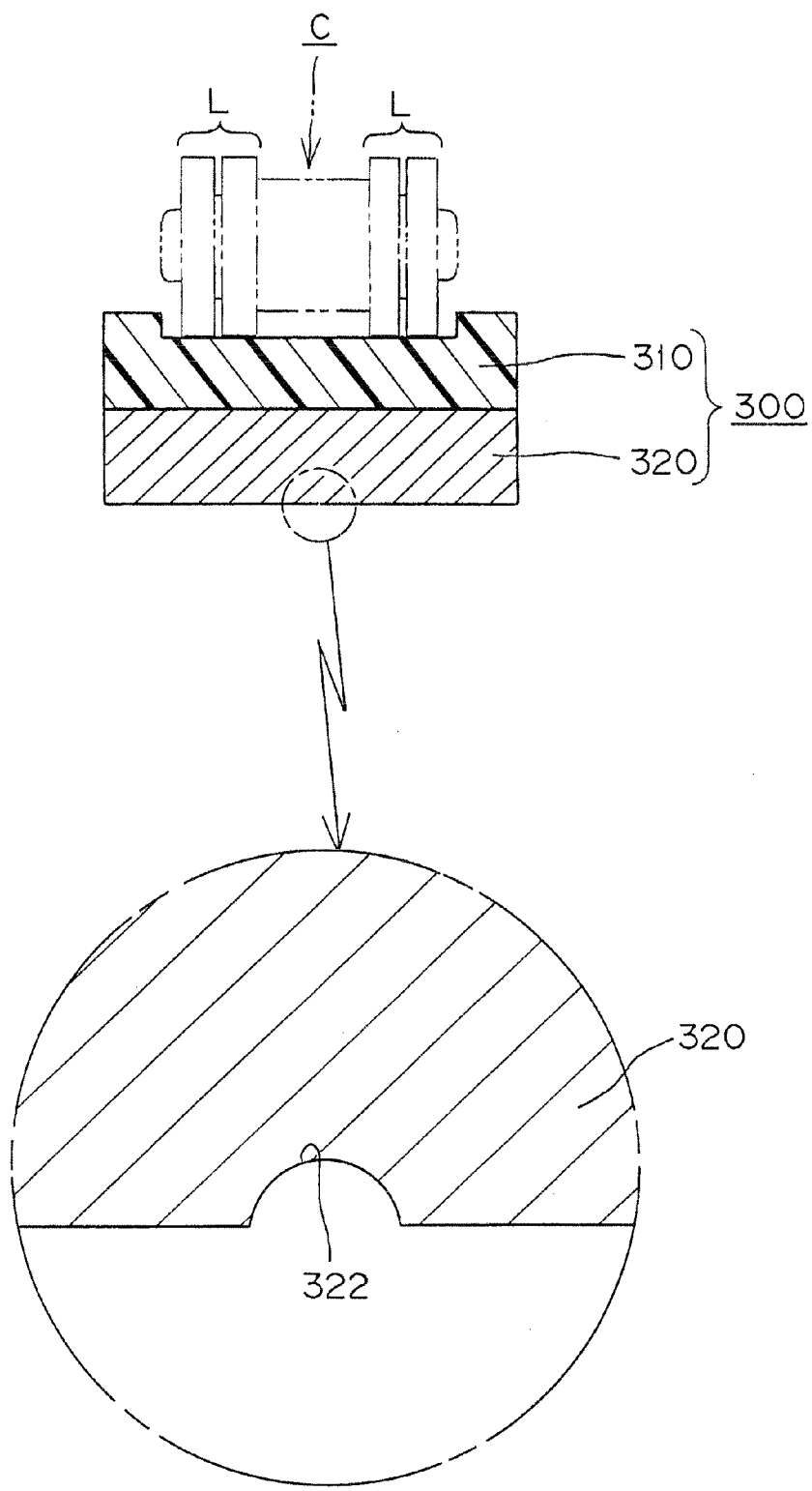
FIG. 5 is a sectional view taken on plane 3-3 in FIG. 2, showing a chain traveling on the guide, and including an enlarged auxiliary view showing another form of groove on the back surface of the base plate.

The chain guide 300, shown in FIG. 5, has a shoe 310 and a base plate 320 that have substantially the same configuration as the shoe and base plate in FIG. 4, except that the narrow reinforcing groove 322 has a semi-circular, arc-shaped, cross-section. The groove 322 removes remaining strain in the base plate 220, significantly improving plate strength and stabilizing the form of the base plate, thereby preventing deformation and breakage of the base plate when an excessive pressing load is applied to the guide by the chain in a high temperature engine environment.

Figure 6:
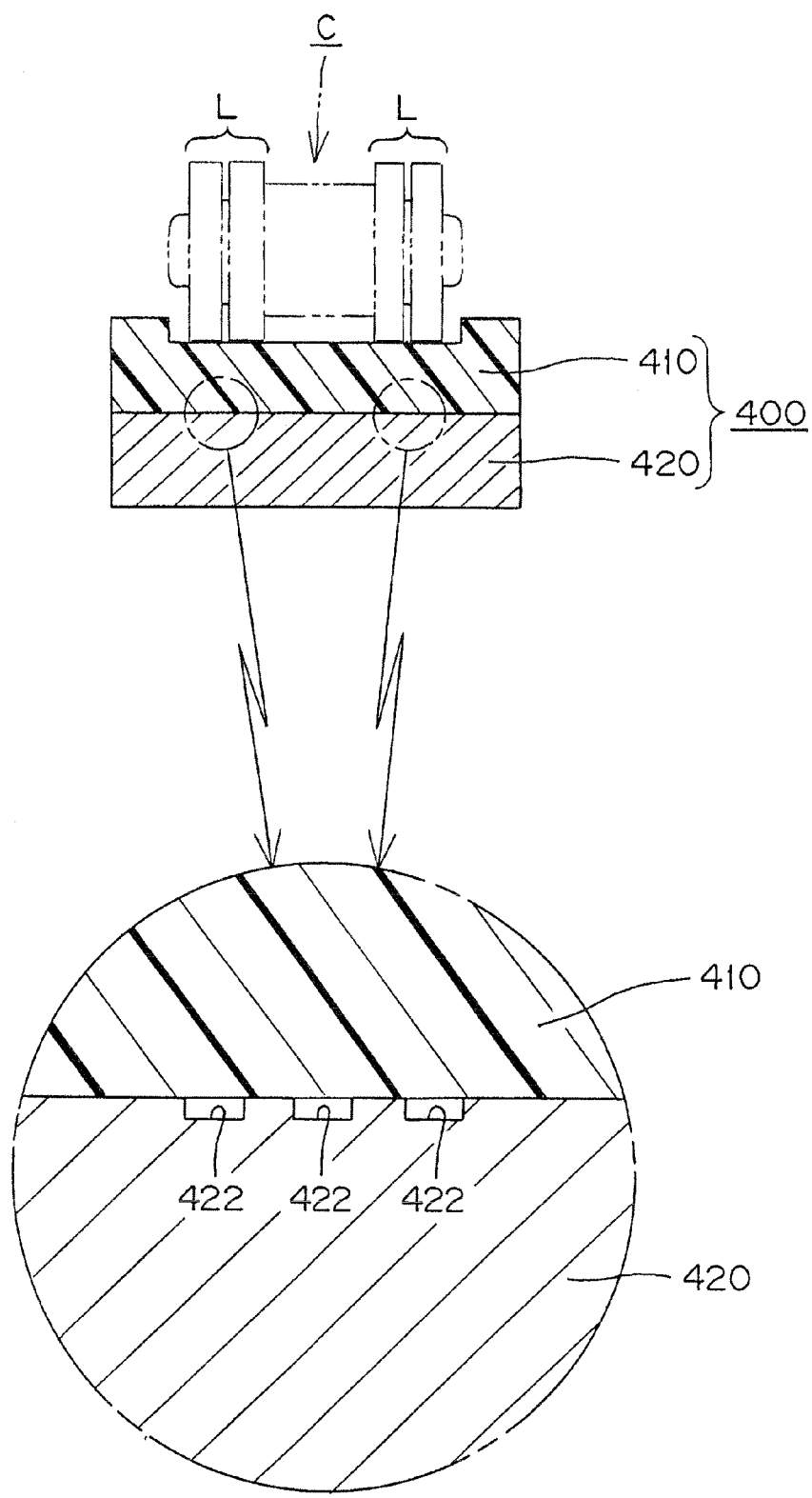
FIG. 6 is a sectional view taken on plane 3-3 in FIG. 2, showing a chain traveling on the guide, and including an enlarged auxiliary view showing plural grooves on the front surface of the base plate.

The chain guide 400, shown in FIG. 6, comprises a shoe 410 and a base plate 420, both having substantially the same general configuration as that of the guides in FIGS. 2-5, except that plural, parallel, elongated, narrow reinforcing grooves 422 are formed in the front surface of the base plate, i.e., the surface engaged with the back of shoe 410. In the case of a transmission utilizing a roller chain, or a rollerless bushing chain, the plural reinforcing grooves 422 are preferably provided in two sets, the sets being located on opposite sides of a longitudinal center line midway between the side edges of the front surface of the base plate. The sets of grooves 422 are thus respectively opposite the link plates L on both sides of the chain. As shown in FIG. 6, the sets of reinforcing grooves are disposed on the front surface of the base plate and inboard with respect to the positions of the chain guiding walls that protrude forward on both sides of the chain-engaging surface of the shoe. Since the chain is guided by the chain guiding walls of the shoe, and its outer link plates will ordinarily be in close proximity to these guide walls, the grooves will be positioned opposite to the link plates of the chain. Positioning the grooves opposite the link plates more reliably dissipates frictional heat generated by sliding contact of the link plates with the front surface of the shoe. As in the previously described embodiments, the narrow reinforcing grooves 422, which are formed by surface pressing, remove remaining strain in the base plate 420, and stabilize its form. Even if an excessive pressing load is applied to the base plate 420 by the link plates L of the chain so that compressive stress acts on the plate along the longitudinal direction of the guide, deformation of the base plate 420 can be effectively suppressed.

Figure 7:
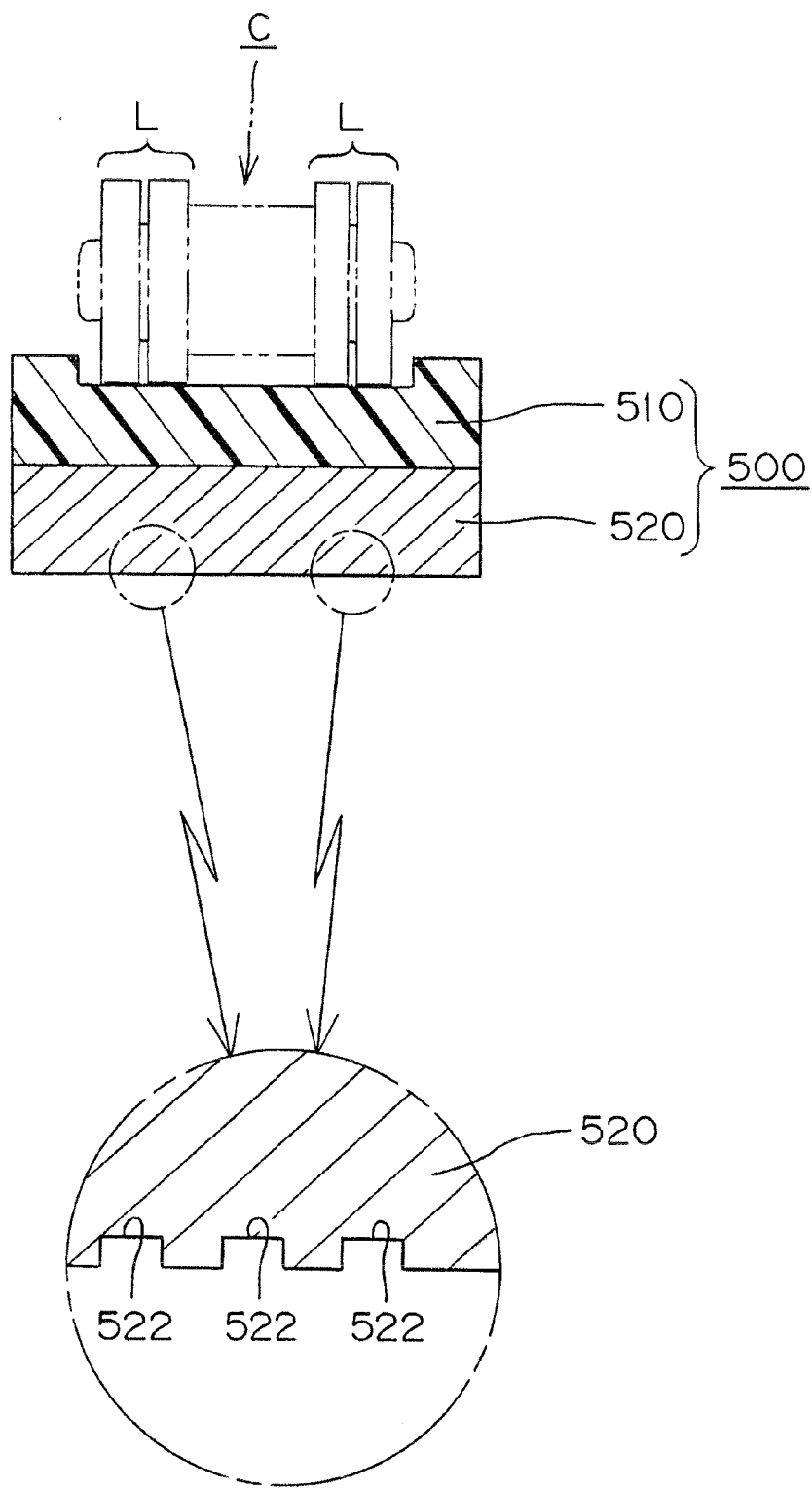
FIG. 7 is a sectional view taken on plane 3-3 in FIG. 2, showing a chain traveling on the guide, and including an enlarged auxiliary view showing plural grooves on the back surface of the base plate.

The chain guide 500, shown in FIG. 7, comprises a shoe 410 and a base plate 520, both having substantially the same general configuration as that of the guide in FIG. 6, except that the two sets of plural, parallel, elongated, narrow reinforcing grooves 522 are formed in the back surface of the base plate, i.e., the surface opposite from the surface engaged with the back of shoe 510. Here, as in the embodiment of FIG. 6, in the case of a transmission utilizing a roller chain, the plural reinforcing grooves 522 are preferably provided in two sets, the sets being located respectively opposite the link plates L on both sides of the chain.

As shown in FIG. 7, the sets of reinforcing grooves are disposed on the back surface of the base plate and inboard with respect to the positions of the chain guiding walls that protrude forward on both sides of the chain-engaging surface of the shoe. The outer link plates of the chain will ordinarily be in close proximity to these guide walls, and the grooves will be positioned opposite the link plates of the chain. Positioning the grooves opposite the link plates more reliably dissipates frictional heat generated by sliding contact of the link plates with the front surface of the shoe. Moreover, as in the previously described embodiments, the narrow reinforcing grooves 522, which are formed by surface pressing, remove remaining strain in the base plate 420, and stabilize its form. Even if an excessive pressing load is applied to the base plate 520 by the link plates L of the chain so that compressive stress acts on the plate along the longitudinal direction of the guide, deformation of the base plate 520 can be effectively suppressed.

Figure 8:
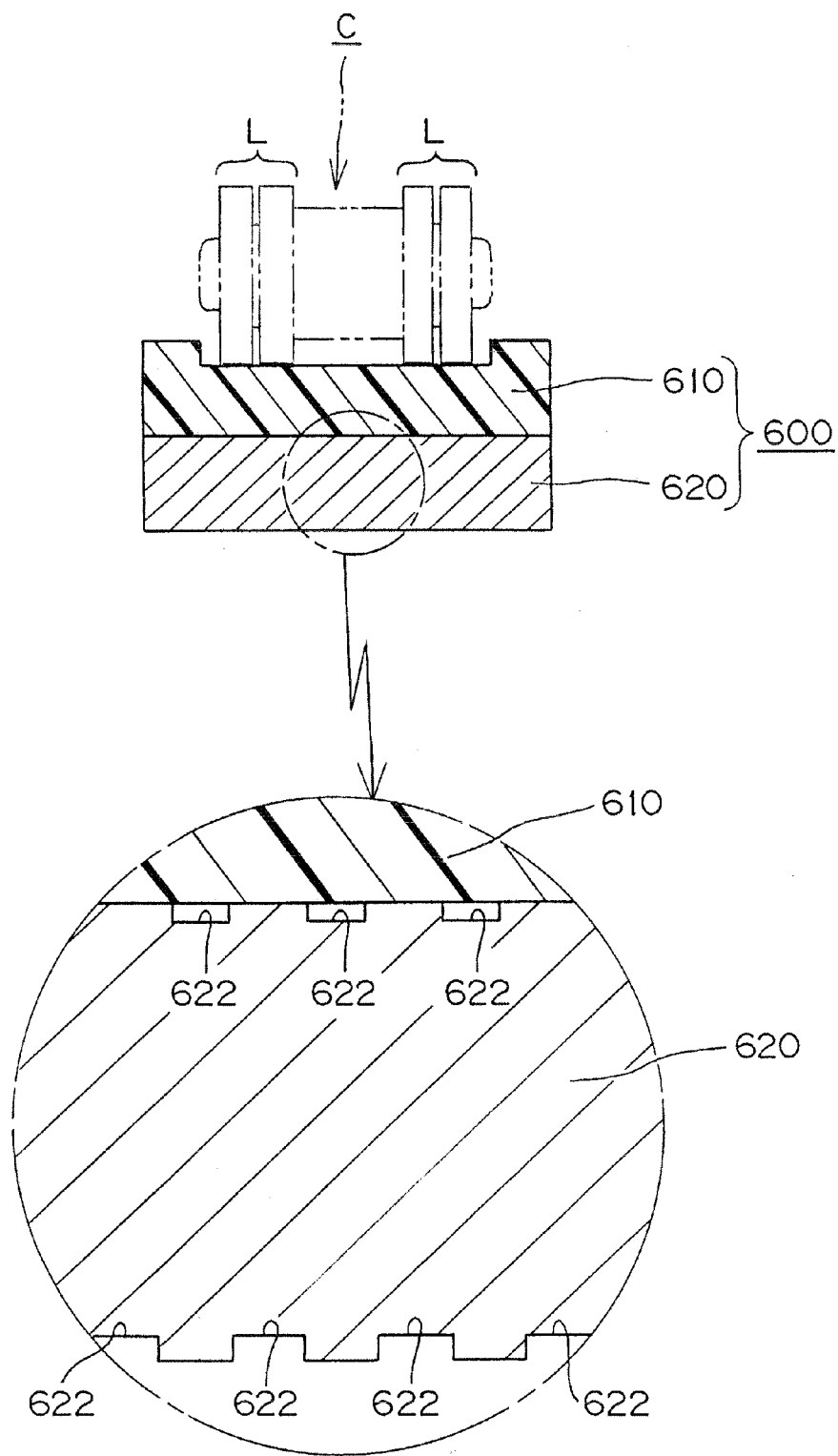
FIG. 8 is a sectional view taken on plane 3-3 in FIG. 2, showing a chain traveling on the guide, and including an enlarged auxiliary view showing plural grooves on both the front and back surfaces of the base plate.

The chain guide 600 shown in FIG. 8 comprises a shoe 610 and a base plate 620, and has the same basic configuration as that of the previously described chain guides except that plural narrow reinforcing grooves 622, are formed on both the front and back sides of the base plate. The grooves 622 have rectangular cross-sections and reliably remove remaining stress in the base plate. Even if an excessive load is applied to the chain guide 600 in a high temperature environment, so that compressive stress acts in the longitudinal direction of the guide on either the front surface or the back surface of plate 620, deformation and breakage of the base plate 620 are suppressed.

What is claimed is:

1. A chain guide for use in an engine, the chain guide comprising:
   an elongated shoe having a convex, curved, front surface for sliding contact with a transmission chain traveling along the direction of elongation of the shoe and a concave back surface opposite from said front surface; and
   an elongated metal base plate, having opposite front and back surfaces, the front surface of the base plate having a convex curvature along the direction of elongation of the base plate and being engaged with the back surface of the shoe, whereby the base plate supports the shoe along substantially the entire length of the shoe, and the back surface of the base plate having a concave curvature along the direction of elongation of the base plate;

wherein the elongated base plate has at least one narrow reinforcing groove formed in one of its front and back surfaces, each said narrow reinforcing groove extending longitudinally along said one of said front and back surfaces and having the same curvature as that of the surface in which it is formed;

wherein each said narrow reinforcing groove is formed by pressing a surface pressing tool having a ridge conforming to the shape of said groove against said one of said front and back surfaces, whereby the metal of said base plate is plasticly deformed; and wherein said shoe has parallel longitudinally extending guide walls, spaced laterally from each other and extending in the direction in which the front surface of the shoe faces, for limiting lateral movement of a chain traveling in sliding contact with said front surface of the shoe, and in which multiple, parallel, narrow, reinforcing grooves are formed in said one of said front and back surfaces of the base plate, said grooves being laterally spaced from one another and located inboard with respect to said longitudinally extending guide walls of the shoe, whereby the grooves are positioned opposite to portions of said front surface of the shoe on which link plates of a roller chain or rollerless bushing chain travel.

2. A chain guide according to claim 1, in which each of said narrow reinforcing grooves has a rectangular cross-sectional shape.

3. A chain guide according to claim 1, in which said narrow reinforcing grooves are formed in the front surface of the base plate.

4. A chain guide according to claim 1, in which said narrow reinforcing grooves are formed in the back surface of the base plate.

* * * * *